United States Patent [19]

Akashi et al.

[11] Patent Number: 4,792,668
[45] Date of Patent: Dec. 20, 1988

[54] APPARATUS FOR DETECTING FOCUSING STATE OF OBJECTIVE LENS

[75] Inventors: Akira Akashi; Akira Ishizaki; Yasuo Suda, all of Yokohama; Ichiro Ohnuki, Tokyo; Keiji Ohtaka, Tokyo; Takeshi Koyama, Tokyo, all of Japan

[73] Assignee: Canon Kabushiki Kaisha, Tokyo, Japan

[21] Appl. No.: 936,746

[22] Filed: Dec. 2, 1986

[30] Foreign Application Priority Data

Dec. 5, 1985 [JP] Japan .................. 60-272563
Dec. 5, 1985 [JP] Japan .................. 60-272564
Dec. 5, 1985 [JP] Japan .................. 60-272565
Dec. 5, 1985 [JP] Japan .................. 60-272566

[51] Int. Cl.$^4$ .............................................. G03B 3/00
[52] U.S. Cl. ................................. 250/201; 354/408
[58] Field of Search ................. 250/201 PF, 204; 354/406-408

[56] References Cited

U.S. PATENT DOCUMENTS 4,387,975 6/1983 Araki ........................... 354/408
4,559,446 12/1985 Suzuki ......................... 354/408
4,573,784 3/1986 Suzuki ......................... 354/408
4,618,236 10/1986 Akashi et al. ................ 354/406

FOREIGN PATENT DOCUMENTS 118019 9/1980 Japan .
155331 12/1980 Japan .
142306 8/1983 Japan .

Primary Examiner—David C. Nelms
Assistant Examiner—Stephone B. Allen
Attorney, Agent, or Firm—Fitzpatrick, Cella, Harper & Scinto

[57] ABSTRACT

An apparatus for detecting a focusing state of an objective lens comprises optical means for forming light intensity distributions of object images whose relative positional relationship changes with the focusing state of the objective lens, sensing means having a plurality of sensors for sensing the light intensity distributions to produce first and second signals relating to the light intensity distributions, signal processing means for relatively displacing the first and second signals by determining correlation information and producing a signal for adjusting the focusing state of the objective lens in accordance with the correlation information, and altering means for altering a displacement range within which the first and second signals are relatively displaced.

10 Claims, 11 Drawing Sheets

APPARATUS FOR DETECTING FOCUSING STATE OF OBJECTIVE LENS

BACKGROUND OF THE INVENTION

1. Field of the Invention

The present invention relates to an improvement in a focusing state detection apparatus which detects a focusing state by a relative positional relationship of light intensity distribution of two images of an object.

2. Related Background Art

In a prior art focus state detection apparatus for a camera, an exit pupil of an imaging lens is divided into two pupil areas and relative positional displacement of two light intensity distributions of two images formed by light fluxes transmitted through the pupil areas are observed to determine an in-focus state. For example, Japanese Patent Application Laid-Open Nos. 118019/1980 and 155331/1980 disclose a secondary focusing system in which a spatial image formed on a predetermined focus plane (corresponding to a film plane) by two secondary focusing optical systems is guided to two sensor planes so that relative positional displacement of the two images is detected.

The secondary focusing type focusing state detection apparatus is shown in FIG. 3. A field lens 3 is arranged coaxially with an optical axis 2 of an imaging lens 1 whose focusing state is to be detected. Two secondary focusing lenses 4a and 4b are arranged behind the field lens 3 symmetrically with respect to the optical axis 2. Sensor arrays (Photo-electric conversion element arrays) 5a and 5b are arranged behind the lenses 4a and 4b. Diaphragms 6a and 6b are arranged in the vicinity of the secondary focusing lenses 4a and 4b. The field lens 3 essentially focuses an exit pupil of the imaging lens 1 onto pupil planes of the two secondary focusing lenses 4a and 4b. As a result, light fluxes applied to the secondary focusing lenses 4a and 4b correspond to those light fluxes which are emitted from non-overlapping equispace areas on the exit pupil plane of the imaging lens 1, corresponding to the secondary focusing lenses 4a and 4b. When a spatial image formed in a vicinity of the field lens 3 is refocused on the planes of the arrays 5a and 5b by the secondary focusing lenses 4a and 4b, the positions of the two light intensity distributions of the two images on the sensor arrays 5a and 5b change in accordance with the displacement of the spatial image along the optical axis. FIG. 5 shows it. In FIG. 4A which shows an in-focus state, the two light intensity distributions are positioned at the centers of the sensor arrays 5a and 5b, in FIG. 4B which shows a near-focus state, the two light intensity distributions are moved away from the optical axis 2, and in FIG. 4C which shows a far-focus state, the two light intensity distributions are moved toward the optical axis 2. These light intensity distributions are photo-electrically converted and the converted electrical signal is processed to detect a relative positional deviation of the two light intensity distributions. In this manner, the focusing state of the imaging lens 1 can be detected.

Methods for processing the photo-electrical converted signal from the sensor arrays 5a and 5b are disclosed in Japanese Patent application Laid-Open No. 142306/1983 and U.S. Pat. No. 4,333,007. Specifically, the following formula is operated for $k_1 \leq k \leq k_2$.

$$\begin{aligned} V(k) &= \sum_{i=0}^{M-1} A(i) \square B(i + |k| + 1) - \\ &\quad \sum_{i=0}^{M-1} A(i+1) \square B(i + |k|)(k < 0) \\ &= \sum_{i=0}^{M-1} A(i+k) \square B(i+1) - \sum_{i=0}^{M-1} A(i+k+1) \square B(i) \ (k \geq 0) \\ &= V_1(k) - V_2(k) \end{aligned} \quad (1)$$

where N is the number of sensors of the sensor array 5a or 5b, A(i) and B(i) are image signals from the i-th elements of the sensor arrays 5a and 5b, and M is the number of pixels processed (M=N−|k|−1) A(i)□B(j) is an operator for A(i) and B(j). For example, $$A(i)\square B(j) = |A(i) - B(j)| \uparrow \quad (2)$$

$$A(i)\square B(j) = |A(i) - B(j)| \uparrow^n \quad (3)$$

$$A(i)\square B(j) = \max|A(i), B(j)| \uparrow \quad (4)$$

$$A(i)\square B(j) = \min|A(i), B(j)| \uparrow \quad (5)$$

The formula (2) represents an absolute value of a difference between A(i) and B(i), the formula (3) represents accumulated product, the formula (4) represents a larger one of A(i) and B(j), and the formula (5) represents a smaller one. By the above definition, $V_1(k)$ and $V_2(k)$ can be considered as correlation amounts in a broad sense from the formula (1), $V_1(k)$ represents the correlation amount at a displacement $(k-1)$, and $V_2(k)$ represents the correlation amount at a displacement $(k+1)$. Accordingly, an evaluation amount V(k) which is the difference between $V_1(k)$ and $V_2(k)$ represents a change of correlation amount of the image signals A(i) and B(i) at a relative displacement k. Since a change is zero at the peak of the correlation amount, it is assumed that the peak of the correlation amount exists in a section [k, k+1] represented by $$V(k) \cdot V(k+1) < 0 \quad (6)$$

and V(k) and V(k+1) are interpolated to detect the deviations of the image signals A(i) and B(i). FIG. 6 shows the light intensity distribution signals A(i) and B(i) for the two images formed when the number of sensors is 16 (N=16). There is a deviation of P. FIG. 7 shows the evaluation amount V(k) of the formula (2) when the relative displacement k is changed within a range of $-N/2 \leq k \leq N/2$. As described above, V(k) and V(k+1) which meet $V(k) \cdot V(k+1) < 0$ are linearly interporated to detect the deviation P. FIG. 7 shows a relationship between the image signals A(i) and B(i) when the evaluation amount V(k) is calculated while the relative displacement k changes in a range of $-3 \leq k \leq 3$. Hatched areas show the sensors which are subject of the correlation.

The processing time of the evaluation amount V(k) significantly varies with a range of processing of the relative displacement k. Accordingly, it is preferable to limit the processing range to a narrow one. However, if the range is too narrow, the deviation of the two images when the imaging lens is in a large defocus state may depart from the processing range of the relative displacement k so that exact focusing state is not detected. Accordingly, a lower limit $k_1$ and an upper limit $k_2$ of the processing range are frequently set to $k_1 = -N/2$ and $k_2 = N/2$, where N is the number of sensors of the sensor array. However, where the processing range for the relative displacement k is preset, the processing may be done over unnecessary range if an imaging lens has a small defocusing state like a wide angle lens. In other words, excess processing is performed and unnecessary processing time is spent for the focusing state detection.

When the deviation P is calculated, contrasts of the two images are usably calculated. If the contrast is lower than a predetermined level, it is determined that the reliability of the resulting deviation P is low and the foucsing state detection is disabled. The disabling operation includes a so-called searching operation, in which the imaging lens is driven by a predetermined distance or continuously while expecting the increase of the contrast necessary for the focusing state detection. However, in the imaging lens having a relatively small maximum defocus amount such as a wide angle lens, the increase of the contrast by the searching operation is not expected because the defocus amount is inherently small.

On the other hand, if the imaging lens has a large maximum defocus amount such as a telescopic lens and the lens is in a large defocus state, a probability that the deviation P of the two images departs from the relative displacement k is high and the focusing state may not be detected.

In the prior art apparatus, since the focusing state detection operation takes a long processing time, high speed photographing cannot be attained particularly in a continuous photographing mode.

SUMMARY OF THE INVENTION

It is an object of the present invention to provide a focusing state detection apparatus which can reduce excess processing to detect the focusing state with a high response.

It is another object of the present invention to provide a focusing state detection apparatus which can exactly detect the focusing state for an exchange lens of an angle.

It is another object of the present invention to provide a focusing state detection apparatus which can exactly detect the focusing state, reduce waste processing and shorten focusing state detection time for an exchange lens of any angle.

It is another object of the present invention to provide a focusing state detection apparatus which can detect the focusing state to allow high speed continuous photographing.

In order to achieve the above objects, in an embodiment of the present invention, the processing range within which first and second signals are relatively displaced is varied with a maximum defocus amount inherent to an objective lens so that the smaller the maximum defocus amount of the objective lens is, the narrower is the processing range. When the focusing state detection is disabled, the maximum defocus amount of the objective lens is compared with a predetermined value, and if the former is smaller, the searching is inhibited so that the waste operation is prevented when the probability that the focusing state detection is enabled by searching is very low.

The processing range is varied in accordance with position information of a focusing component along an optical axis so that the processing range fully covers the movable range of the focusing component along the optical axis.

The processing range is varied in accordance with the maximum defocus amount of the objective lens and the position information of the focusing component along the optical axis so that the smaller the maximum defocus amount of the objective lens is, the narrower is the processing range, and the processing range always corresponds to the movable range of the focusing component along hhe optical axis.

In the continuous photographing mode, the processing range is narrower, compared to than a normal processing range after at least two frames of the continuous photographing mode so that the focusing state detection time is shortened.

DETAILED DESCRIPTION OF THE PREFERRED EMBODIMENTS

The preferred embodiments of the present invention will now be described.

Figure 1:
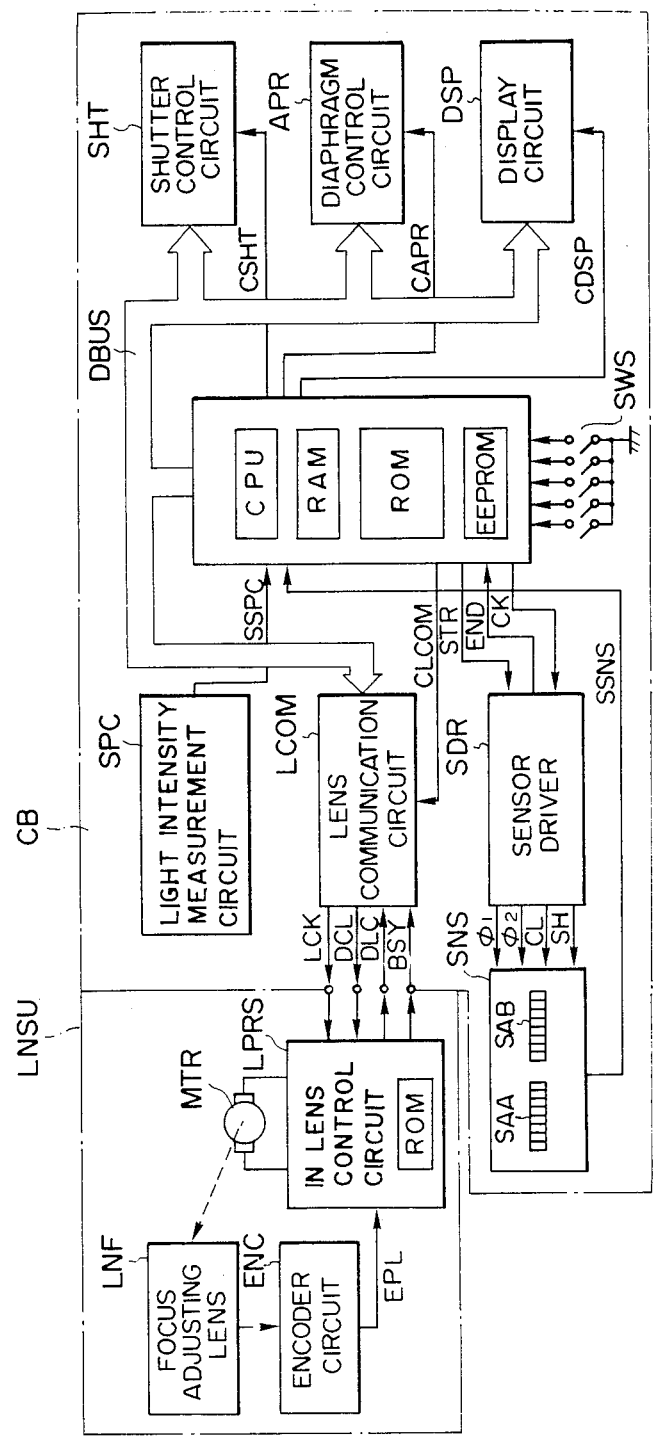
FIG. 1 shows a block diagram of an embodiment of a focusing state detection apparatus of a camera in accordance with the present invention.

FIG. 1 shows a block diagram of an embodiment of a focusing state detection apparatus for a camera in accordance with the present invention. CB denotes a camera body. PRS denotes a control circuit of the camera which may be a one-chip microcomputer which contains CPU, RAM, ROM, EEPROM (electrically erasable programmable ROM) and input/output ports. The ROM and EEPROM store a series of controlling software and parameters including those for AF control, DBUS denotes a data bus, SHT denotes a shutter control circuit which accepts data supplied from the data bus DBUS while a control signal CSHT is supplied thereto from the control circuit PRS and controls the drive of a shutter leading curtain and trailing curtain in accordance with the input data. APR denotes a diaphragm control circuit which accepts data supplied from the data bus DBUS while the control signal CAPR is applied thereto and controls a diaphragm mechanism (not shown) in accordance with the input data. DSP denotes a display circuit which accepts data supplied from the data bus DBUS while the control signal CDSP is applied thereto and displays imaging information based on the input data. SWS denotes a group of switches such as release switch, continuous photographing mode switch and information setting switches.

SPC denotes a light intensity measurement circuit. An analog light intensity signal SSPC from the circuit SPC is supplied to the control circuit PRS where it is A/D converted for use as light intensity data to control the shutter control circuit SHT and the diaphragm control circuit APR. LCOM denotes a lens communication circuit which accepts data supplied from the data bus DBUS while the control signal CLCOM is applied thereto and serially communicates with a lens unit to be described later in accordance with the input data. It transmits data DCL for driving the lens in synchronism with a clock signal LCK to an in-lens control circuit to be described later and serially receives from the in-lens control circuit, lens information DLC such as current position of the imaging lens. BSY denotes a signal to inform the camera that the imaging lens is moving. When this signal is present the serial communication is not undertaken.

LNSU denotes the lens unit, and LPRS denotes the in-lens control circuit for driving a motor MTR in accordance with the serial input data DCL to move the imaging lens LNF. It includes a ROM which stores the maximum defocus amount, a focal distance and an open F value of the imaging lens LNF. ENC denotes an encoder which detects a pulse signal generated as a lens bodytube (which holds the imaging lens LNF) is moved and supplies to the in-lens control circuit LPRS current axial position information DV of the imaging lens LNF, that is, current focusing state information. SDR denotes a sensor drive circuit for controlling a line sensor SNS such as CCD sensor having two sensor arrays SAA and SAB in accordance with the input signals from the control circuit PRS. The sensor arrays SAS and SAB may be two sections of one sensor array.

The operation is now explained with reference to a flow chart of FIG. 2. Because the operations of the shutter control circuit SHT, diaphragm control circuit APR, display circuit DSP and light intensity measurement circuit SPC are not directly related to the present invention, the explanation thereof is omitted.

Figure 3:
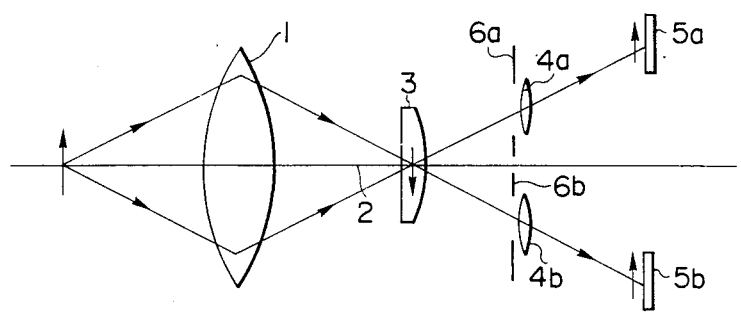
FIG. 3 shows an arrangement of an optical system of a conventional secondary focusing type focusing state detection apparatus.
Figure 4A:
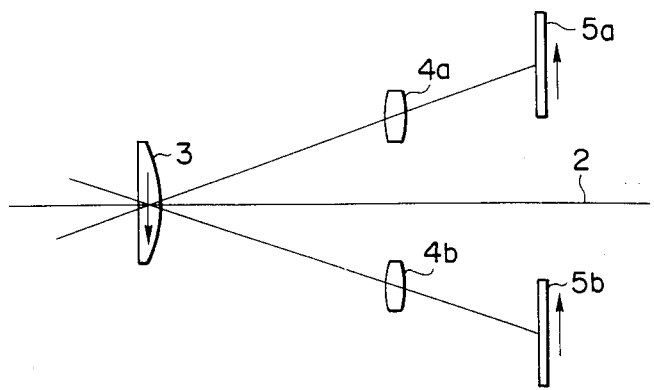
FIG. 4 shows a relationship between a focusing state and an image deviation in the secondary focusing system.
Figure 4B:
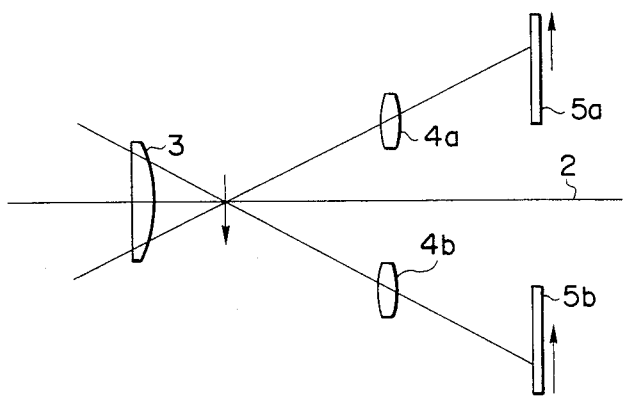
Figure 4C:
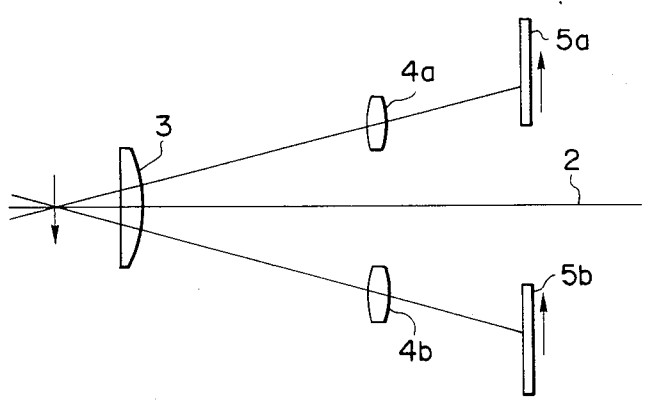
Figure 5:
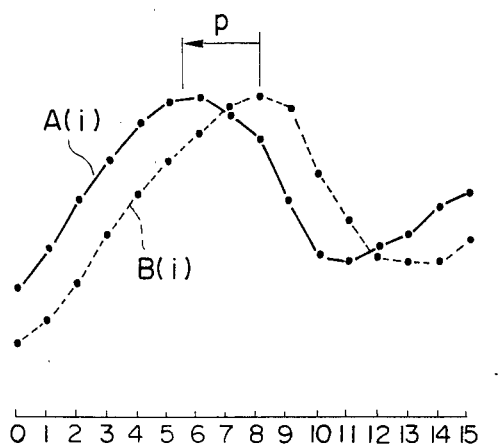
FIG. 5 shows image signals produced by two sensors in the secondary focusing system.
Figure 6:
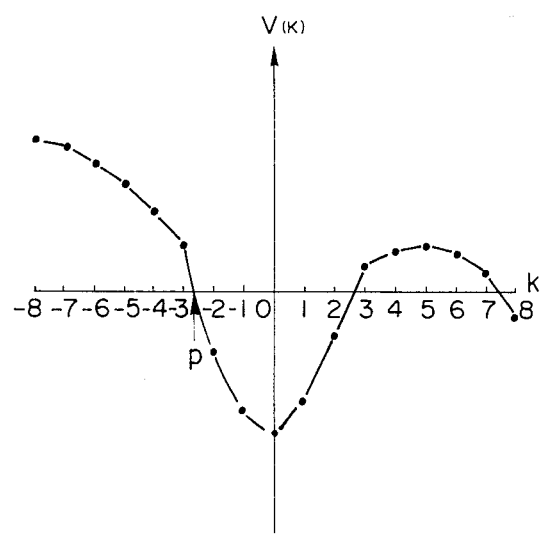
FIG. 6 shows a change of evaluation amount in the secondary focusing system.
Figure 7:
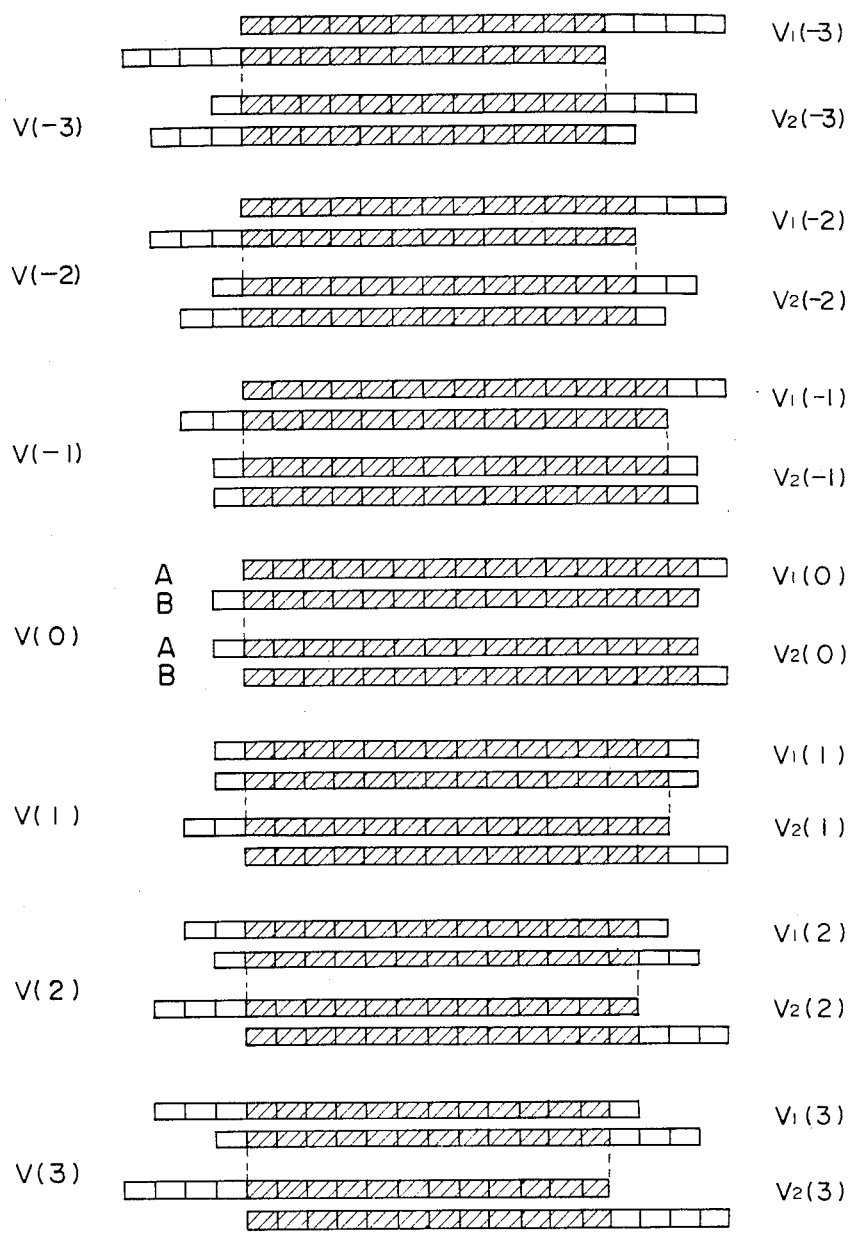
FIG. 7 shows a relationship between two images in the focusing state detection in the secondary focusing system.

(Step 1) The line sensor SNS is driven through the sensor drive circuit SDR to produce image signals A(i) and B(i) of the two images. The operations of the control circuit PRS, sensor drive circuit SDR and line sensor SNS are briefly explained. When a start of storage signal STR is generated in the control circuit PRS, the sensor drive circuit SDR supplies a clear signal CL to the line sensor SNS to clear charges of the photoelectric converters of the sensor arrays SAA and SAB. Then, the line sensor SNS starts the photo-electric conversion and charge storage of the optical images formed on the sensor arrays SAA and SAB by the secondary focusing lens (not shown in FIG. 1 but arrayed as shown in FIG. 3). After a predetermined time period since the above operation has been started, the sensor drive circuit SDR supplies a transfer signal SH to the line sensor SNS to transfer the charges stored in the photo-electric converters to the CCD. The sensor drive circuit SDR also senss an end of storage signal END to the control circuit PRS and waits for a CCD drive clock CK to be supplied from the control circuit PRS. When the CCD drive clock CK is supplied, the sensor drive circuit SDR generates CCD drive signals $\phi_1$ and $\phi_2$, which are supplied to the line sensor SNS. When the CCD drive signals $\phi_1$ and $\phi_2$ are supplied, the line sensor SNS supplies an analog image signal SSNS to the control circuit PRS. Thus, the control circuit PRS A/D converts the analog image signal SSNS in synchronism with the CCD drive clock CK and stores the image signals A(i) and B(i) of the two images at predetermined addresses in the RAM.

(Step 2) The state of the continuous photographing mode switch of the switch group SWS is checked, and if it is in the continuous photographing mode, the process proceeds to a step 13, and if not, the process proceeds to a step 3.

(Step 3) Communication is made with the lens unit LNSU through the lens communication circuit LCOM to obtain the maximum defocus amount MD of the imaging lens LNS currently mounted from the lens information DLC. The relative displacement k is then set in the processing range of $-MD \leq k \leq MD$, that is, $k_1 = -MD$ and $k_2 = MD$.

(Step 4) The correlation processing shown in the formulas (2)-(5) is performed to obtain the focusing state detection information or the deviation P of the two images.

(Step 5) If the contrast of the signal is too low to assure the reliability of the result even if the deviation P is detected, the focusing state cannot be detected. Thus, the process proceeds to a step 10. Otherwise, the process proceeds to a step 6.

(Step 6) The absolute value of the deviation P is compared with a predetermined value, and if the former is smaller, that is, in an in-focus state, the process proceeds to a step 9, and otherwise the process proceeds to a step 7.

(Step 7) A sign (plus or minus) of the deviation P is checked to determine near-focus or far-focus. The data thereof is sent to the display circuit DSP to display the focusing state.

(Step 8) The movement of the imaging lens LNF is calculated in accordance with the deviation P determined in the step 4 and the data thereof is sent to the in-lens control circuit LPRS through the lens communication circuit LCOM. The in-lens control circuit LPRS drives the motor MTR to move the imaging data to the position corresponding to the data, that is, until the number of encoder pulse signals EPL supplied from the encoder ENC reaches the number designated by the data.

(Step 9) Data indicating the in-focus state is sent to the display circuit DSP to display the in-focus state.

(Step 10) The maximum defocus amount MD obtained in the step 3 is compared with a fixed defocus amount MS, and if MD > MS, the process proceeds to a step 12, and and if MD ≦ MS, the process proceeds to a step 11.

(Step 11) If MD ≦ MS, it means that the maximum defocus value of the imaging lens LNF currently mounted is relatively small. In this case, even if the imaging lens LNF is driven by a predetermined distance, that is, searched to retry the focusing state detection, the increase of the contrast is not expected because the maximum defocus amount is inherently small and hence a probability that the focusing state detection is enabled is low. Accordingly, in such a case, the searching is not carried out and the data indicating that the focusing state detection is disable is supplied to the display circuit DSP and displayed thereby. Then, the process returns to the step 1.

(Step 12) If MD>MS, a probability that the focusing state detection is enabled by the searching is high, as opposed to the case where MD≦MS. Thus, the searching is carried out.

(Step 13) In the continuous photographing mode, the focusing state must be detected in a shorter time than the single photographing mode. During the continuous photographing mode, it is expected that the change of defocus amount of the object is small. Accordingly, a relative displacement $k_c$ in a relatively narrow processing range is set, that is, $k_1 = -k_c$ and $k_2 = k_c$ to speed up the processing.

(Step 14) The correlation processing is performed in the processing range set in the step 13 to obtain the focusing state detection information.

(Step 15) Whether the focusing state detection is enabled or not is determined like in the step 5. If the focusing state detection is disabled, the searching in the continuous photographing mode is not desirable in view of high speed photographing. Accordingly, the process proceeds to the step 11 to display the disabling. If the focusing state detection is enabled, the process proceeds to the step 6 to determine whether in-focus state is attained or not. Then, the process proceeds to the step 9 or steps 7 and 8.

In the present embodiment, the maximum defocus amount MD of the lens currently mounted is obtained from the ROM in the in-lens control circuit LPRS, the processing range for the correlation processing is set in accordance with the maximum defocus amount MD, that is, the range of the relative displacement k is set widely if a lens having a large maximum defocus amount such as a telescopic lens is mounted and the range of the relative displacement k is set narrowly if a lens having a small maximum defocus amount MD such as a wide angle lens is mounted. Accordingly, in the former case, the disabling of the focusing state detection due to loss of common intensity distribution when the defocus amount is large is prevented, and in the latter case, a excess processing time is omitted and the focusing state detection time is shortened.

In the present embodiment, the maximum defocus amount MD of the lens mounted is obtained from the lens unit LNSU. The present invenion is also applicable to a case where such information is manually set. A zoom lens having a selectable focal distance may be used.

In the present embodiment, the maximum defocus amount MD of the lens currently mounted is obtained from the ROM of the in-lens control circuit LPRS and whether the searching is to be carried out or not is determined in accordance with MD. Namely, if the imaging lens (such as a wide angle lens which does not bring an expected effect even if the searching is carried when the focusing state detection is disabled) is mounted, the searching is not carried out. Accordingly, the focusing state detection time is shortened and waste power consumption is prevented.

In the present embodiment, the maximum defocus amount of the imaging lens is compared with the fixed defocus amount MS. An intensity may be added to the fixed defocus amount. That is, if the intensity is low, the fixed defocus amount MS may be somewhat lowered to broaden the range of the searching.

An operation of another embodiment is explained with reference to FIGS. 8 and 9.

Figure 2:
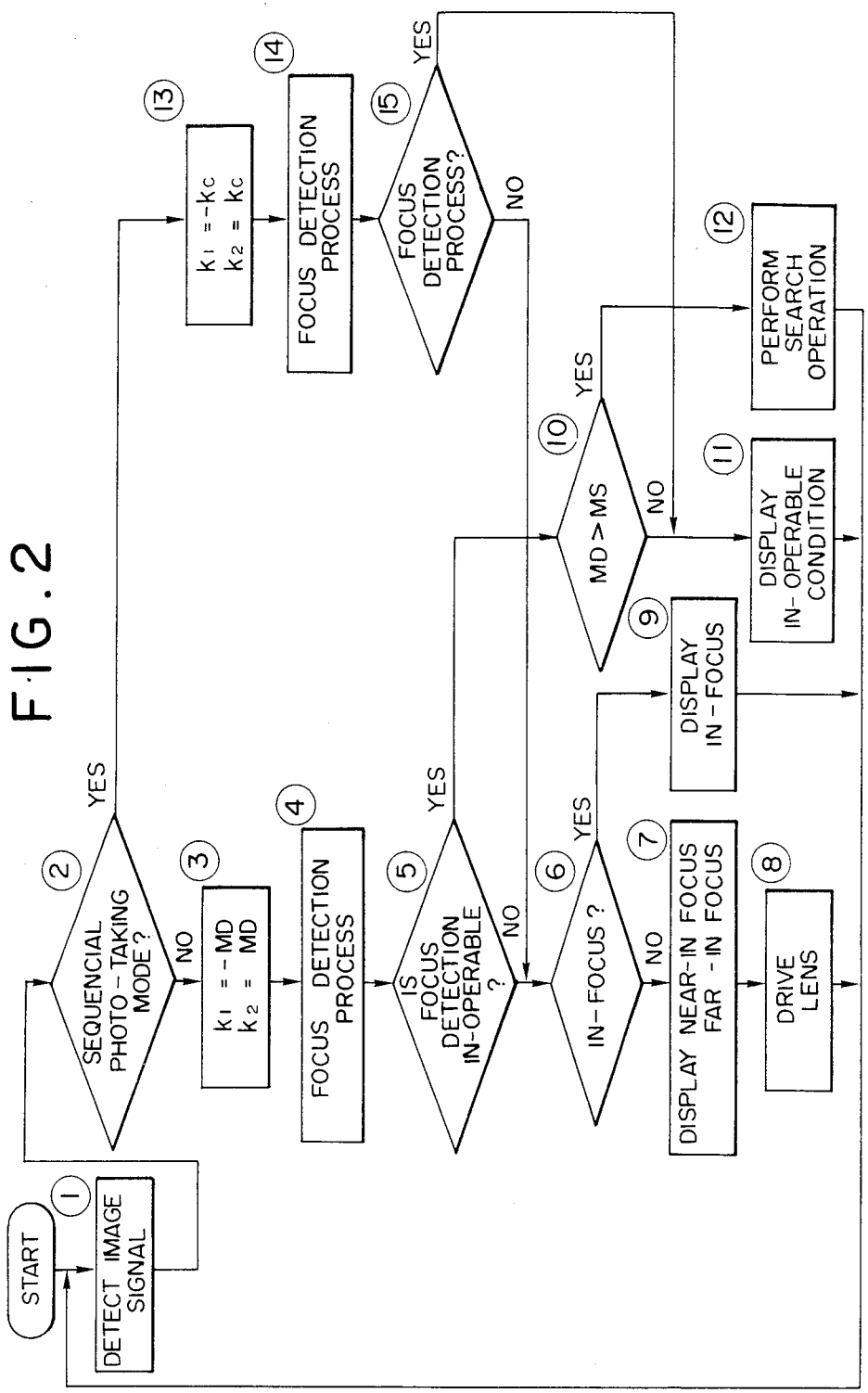
FIG. 2 shows a flow chart thereof.

(Step 21) This step is identical to the step 1 of FIG. 2.

(Step 22) The state of the continuous photographing mode switch of the switch group SWS is checked. If it is the continuous photographing mode, the process proceeds to a step 31, and if not, the process proceeds to a process 23.

(Step 23) Communication is established with the lens unit LNSU through the lens communication circuit LCOM to obtain the position information DV of the imaging lens LNF from the lens information DLC, and the processing range for the relative displacement k is set to $-N/2+DV \leq k \leq N/2+DV$, that is, $k_1 = -N/2+DV$, $k_2 = N/2+DV$, in accordance with the position information DV.

The position information DV is zero when the imaging lens LNF is at the center of the movable range, negative when it moves toward a near position. and positive when it moves toward an infinite position Accordingly, the imaging lens LNF is displaced in a direction at which all of the above described processing range can be covered, keeping the relative displacement k in the processing range constant.

That is explained in further detail with reference to FIG. 3.

For example, in view of that the number of pixels in a sensor arrays SAA and SAB is 24 (N=24), the processing range of the displacement k is set to be $-12 \leq k \leq 12$. Let us assume, in view of the above state, that the movable range of the imaging lens LNF is 20 mm, and the displacement of one pixel of the sensor corresponding to 1 mm in the movable range of the imaging lens LNF. When the imaging lens LNS is at an arrow position a (infinite position), the position information DV is (+10) and the processing range is $$k_1 = -12+10 = -2$$

$$k_2 = 12+10 = 22$$

In the above case, where the processing range of the relative displacement k is constant, the displacement in the processing range becomes large, as shown in FIG. 3.

In the prior art system the processing range for the relative displacement k is that shown by broken lines and hense the focusing state detection is disabled when the defocus amount is large. By the use of the positional information DV, the area which could not heretofore been covered can be included in the processing range and the disabling of the focusing state detection is prevented. On the other hand, when the imaging lens LNF is at an arrow position c (very near position), the position information DV is −10 and the processing range is $$k_1 = -12+(-10) = -22$$

$$k_2 = 12+(-10) = 2$$

In that case, the displacement in a indifinite direction to be covered with the process becomes larger. When the imaging lens LNF is at an arrow position b (center of the movable range), the operation is the same as that in the prior art.

(Step 24) The correlation processing shown in the formula (1) is carried out to obtain the focusing state detection information or the deviation P of the two images.

(Steps 25 to 28) These steps are identical to the steps 5 to 8.

(Step 30) The imaging lens LNF is driven by a predetermined distance for searching.

(Step 31) In the continuous photographing mode, the focusing state must be detected in a shorter time than the single photographing mode, and the change of the defocus amount of the object is small. Thus, the relative displacement $k_c$ is set to a relatively narrow processing range, that is, $k_1 = -k_c$ and $k_2 = k_c$ to speed up the processing.

(Step 32) The correlation processing is carried out to obtain the focusing state detection information in the processing range set in the step 31.

(Step 33) Whether the focusing state detection is enabled or not is detected as is done in the step 25. If the focusing state detection is disabled, the process proceeds to a process 34, and if it is enabled, the process proceeds to a step 26 to determine if the in-focus state is attained. Then, the process proceeds to the step 29 or the steps 27 and 28.

(Step 34) Since it is not desirable to carry out the searching during the continuous photographing mode in view of speed, data indicating that the focusing state detection is disabled is sent to the display circuit DSP for displaying it.

Figure 8:
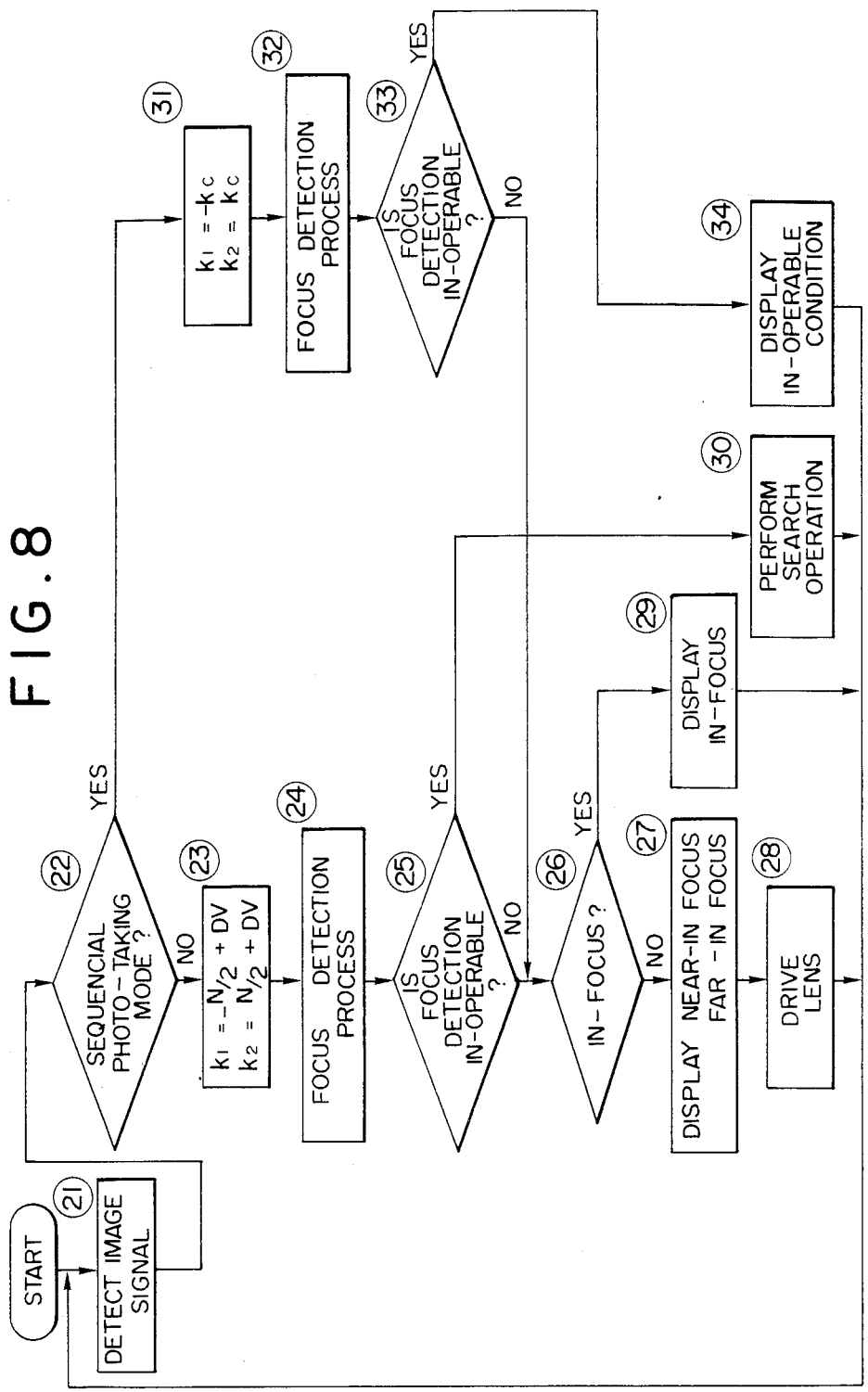
FIG. 8 shows a flow chart of another embodiment.
Figure 9:
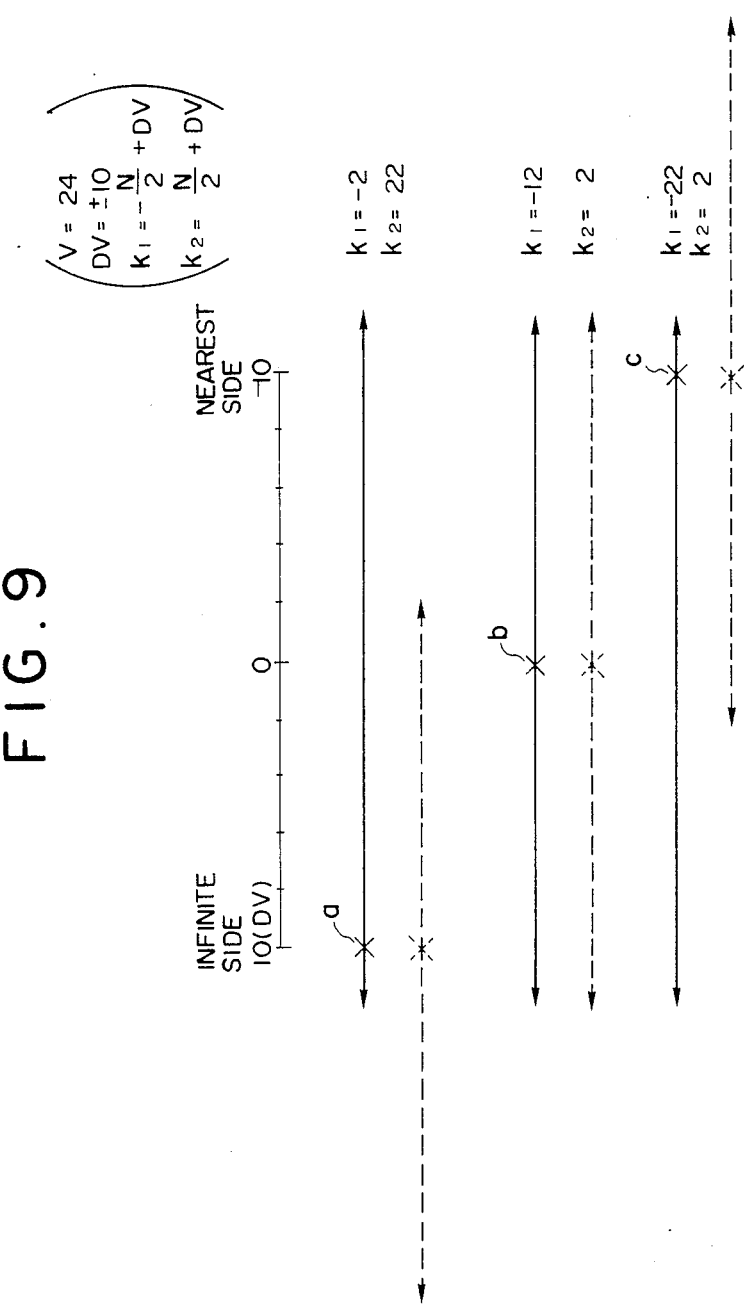
FIG. 9 shows a processing range for a relative displacement when position information of an imaging lens is used.

In the embodiment shown in FIGS. 8 and 9, the range of the relative displacement k is set in accordance with the position information DV of the imaging lens LNF at the start of the focusing state detection. Accordingly, the focusing state detection is assured even if an imaging lens LNF having the defocus amount of as large as N/2 is mounted.

The operation where the position information DV and the maximum defocus amount MD of the imaging lens LNF are used is explained with reference to FIGS. 10 and 11.

(Step 41) The line sensor SNS is driven through the sensor drive circuit SDR to obtain the image signals A(i) and B(i) of the two images.

(Step 42) The state of the continuous photographing mode switch of the switch group SWS is checked. If it is the continuous photographing mode, the process proceeds to a step 53, and if not, the process proceed to a step 43.

(Step 43) Communication is established with the lens unit LNSU through the lens communication circuit LCOM to obtain the maximum defocus amount MD' of the imaging lens LNF currently mounted (for example, one half of the maximum defocus amount MD of the actual imaging lens LNF) and the position information DV of the imaging lens LNF from the lens information DLC, and the relative displacement k is set in the range of $-MD'+DV \leq k \leq MD'+DV$, that is, $k_1 = -MD'+DV$, $k_2 = ML'+DV$, in accordance with the above information. As described above, the position information DV is zero when the imaging lens LNF is at the center of the movable range, negative when it moves toward a near position, and positive when it moves toward an infinite position. Accordingly, when the processing range for the relative displacement k is determined, the maximum defocus amount MD' which is, for example, one half of the maximum defocus amount MD of the actual imaging lens LNF is used. Thus, this value is used as the maximum defocus amount of the imaging lens LNF.

This is explained in further detail with reference to FIG. 11. Let us assume that the maximum defocus amount MD' of the imaging lens LNF is 10 mm (actual maximum defocus amount MD is 20 mm) and the movable range of the imaging lens LNS is 20 mm. When the imaging lens LNS is at an arrow position a (infinite position), the position information DV is 10 and the processing range is $$k_1 = -10 + 10 = 0$$

$$k_2 = 10 + 10 = 20$$

Figure 11:
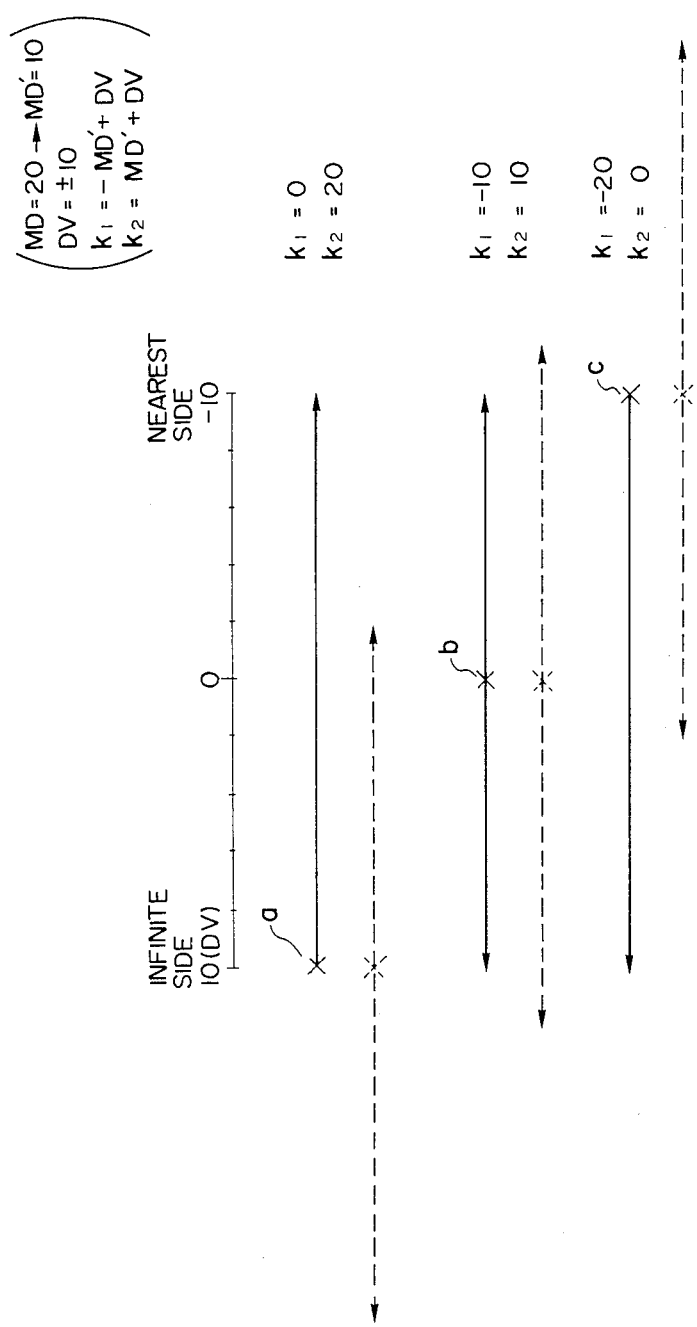
FIG. 11 shows a processing range for a relative displacement when position information of an imaging lens is used.

Thus, as shown in FIG. 11, the processing range coincides with the movable range of the imaging lens LNS, and the disabling of the focusing state detection is prevented and no waste processing is carried out. In the prior art system (which the number of pixels is 24 (N=24)), the processing range for the relative displacement k is that shown by broken lines and hence a long time is required for the focusing state detection (this is remarkable for a wide angle lens) and the focusing state detection is disabled when the defocus amount is large. By the use of the maximum defocus amount MD', the processing range coincides with the movable range of the imaging lens LNF. By the use of the position information DV, the portion which could not heretofore been covered can be included in the processing range. Accordingly, the focusing state detection time can be shortened and the disabling of the focusing state detection is prevented. When the imaging lens is at an arrow position C (very near position), the positional information DV is −10 and the processing range is $$k_1 = -10 + (-10) = -20$$

$$k_2 = 10 + (-10) = 0$$

when the imaging lens LNF is at an arrow position b (center of the movable range), the position information DV is 0 and the processing range is $$k_1 = -10 + 0 = -10$$
ti $k_2 = 10 + 0 = 10$

[Step 44] The correlation processing shown in the formula (1) is carried out to obtain the focusing state detection information or the deviation P of the two images.

[Step 45] If the reliability of the result is low because the contrast of the signal is low even if the deviation P can be detected, the focusing state detection is disabled. In this case, the process proceeds to a step 50, and if the focusing state detection is enabled, the process proceeds to a step 46.

[Step 46] The absolute value of the deviation P is compared with a predetermined value, and if the former is smaller, that is, if the displacement is such that the focusing state can be regarded as in-focus state, the process proceeds to a step 49, and if the former is larger, the process proceeds to a step 47.

[Step 47] Whether the focusing state is near-focus or far-focus is determined by the sign (plus or minus) of the deviation P, and the detected data is sent to the display circuit DSP to display the focusing state.

[Step 48] The distance of drive of the imaging lens LNF is calculated based on the deviation P obtained in the step 44, and the calculated data is sent to the in-lens control circuit LPRS through the lens communication circuit LCON. The operation of the lens unit LNSU is briefly explained. The in-lens control circuit LPRS drives the motor MTR to drive the imaging lens LNS to the position corresponding to the above data, that is, to drive the imaging lens LNS until the number of encoder pulse signals EPL supplied from the encoder ENC searches the value specified by the data.

[Step 49] The data indicating the in-focus state is sent to the display circuit DSP to display it.

[Step 50] The maximum defocus amount MD obtained in the step 43 and determined to disable the focusing state detection in the step 45 is compared with the fixed defocus amount MS, and if MD>MS, the process proceeds to a step 52, and if MD≦MS, the process proceeds to a step 51.

[Step 51] If MD≦MS, it means that the maximum defocus amount of the imaging lens LNF currently mounted is relatively small. In this case, even if the imaging lens LNF is moved by a predetermined distance, that is, searching is carried out to detect the focusing state, the increase of the contrast is not expected because the defocus amount is inherently small. Thus, a probability that the focusing state detection is enabled is low. Accordingly, in such a case, the searching is not carried out and the data indicating that the focusing state detection is disabled is supplied to the display circuit DSP to display it. Then, the process returns to the step 41.

[Step 52] If MD>MS, a probability that the focusing state detection is enabled by the searching is high a opposed to the case where MD≦MS. Thus, the searching is carried out.

[Step 53] This is identical to the step 31 of FIG. 8.

[Step 54] This is identical to the step 32 of FIG. 8.

[Step 55] Like in the step 45, whether the focusing state detection is enabled or not is determined, and if the focusing state detection is disabled, the searching during the continuous photographing mode is not preferable from the standpoint of speed. Thus, the process proceeds to the step 51 to display the disabling. If the focusing state detection is enabled, the process proceeds to the step 46 where whether the in-focus state is attained or not is checked. Then, the process proceeds to the step 49 or the steps 47 and 48.

Figure 10:
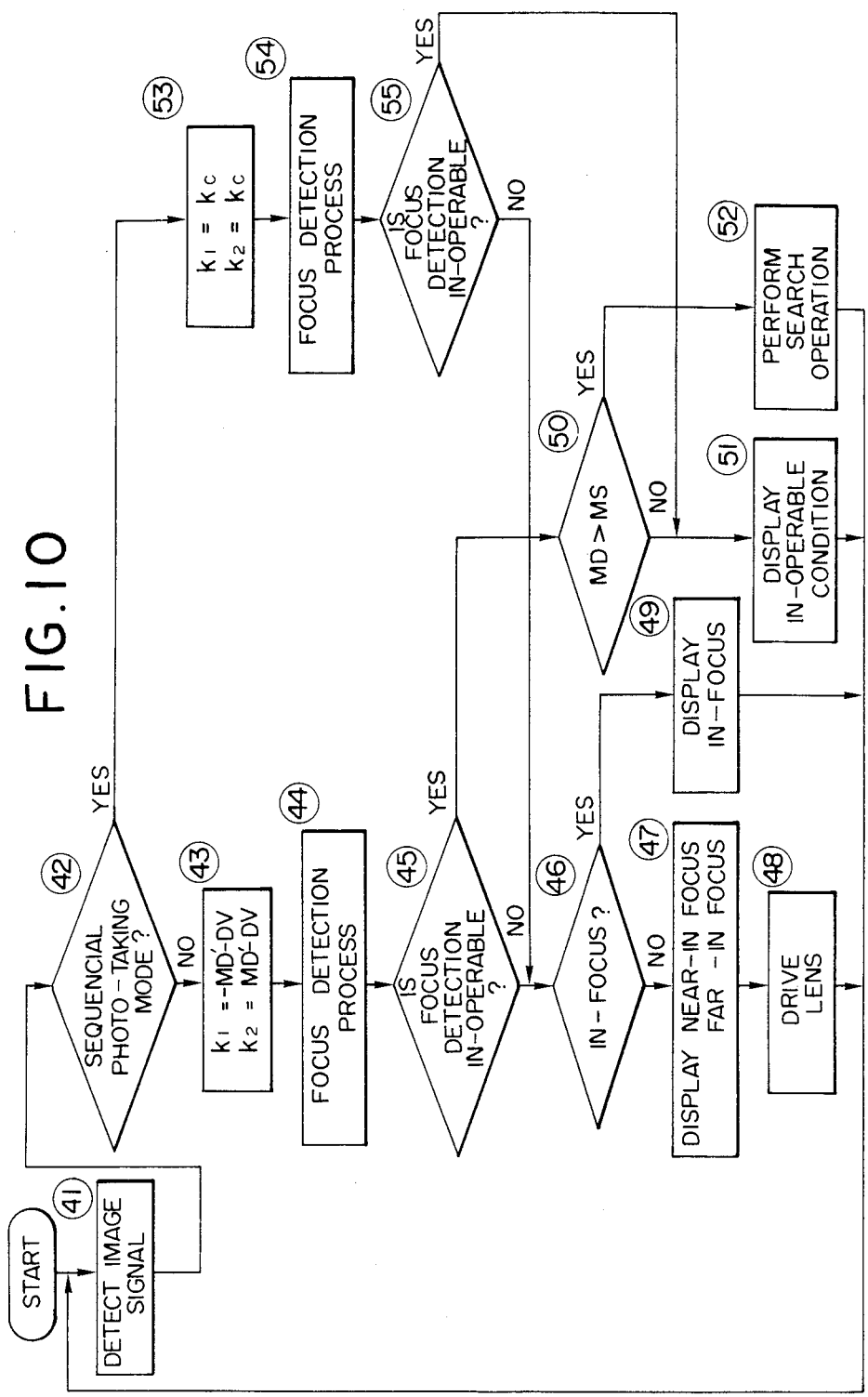
FIG. 10 shows a flow chart of another embodiment.

In the embodiment of FIG. 10, the maximum defocus amount MD of the lens currently mounted is obtained from the ROM in the in-lens control circuit LPRS, and the processing range for the relative displacement k is set in accordance with the maximum defocus amount MD. That is, when a lens having a large maximum defocus amount such as a telescopic lens is mounted, the processing range is set widely, and if a lens having a small maximum defocus amount MD such as a wide angle lens is mounted, the processing range is set narrowly. The position information DV of the imaging lens LNF at the start of the focusing state detection is obtained and the relative displacement k is displaced in an effective direciton to determine the processing range. Accordingly, the processing range coincides with the movable range of the imaging lens LNF and whatever focusing lens is mounted the focusing state detection is assured and excess processing time can be saved so that the focusing state detection time can be shortened.

Figure 12:
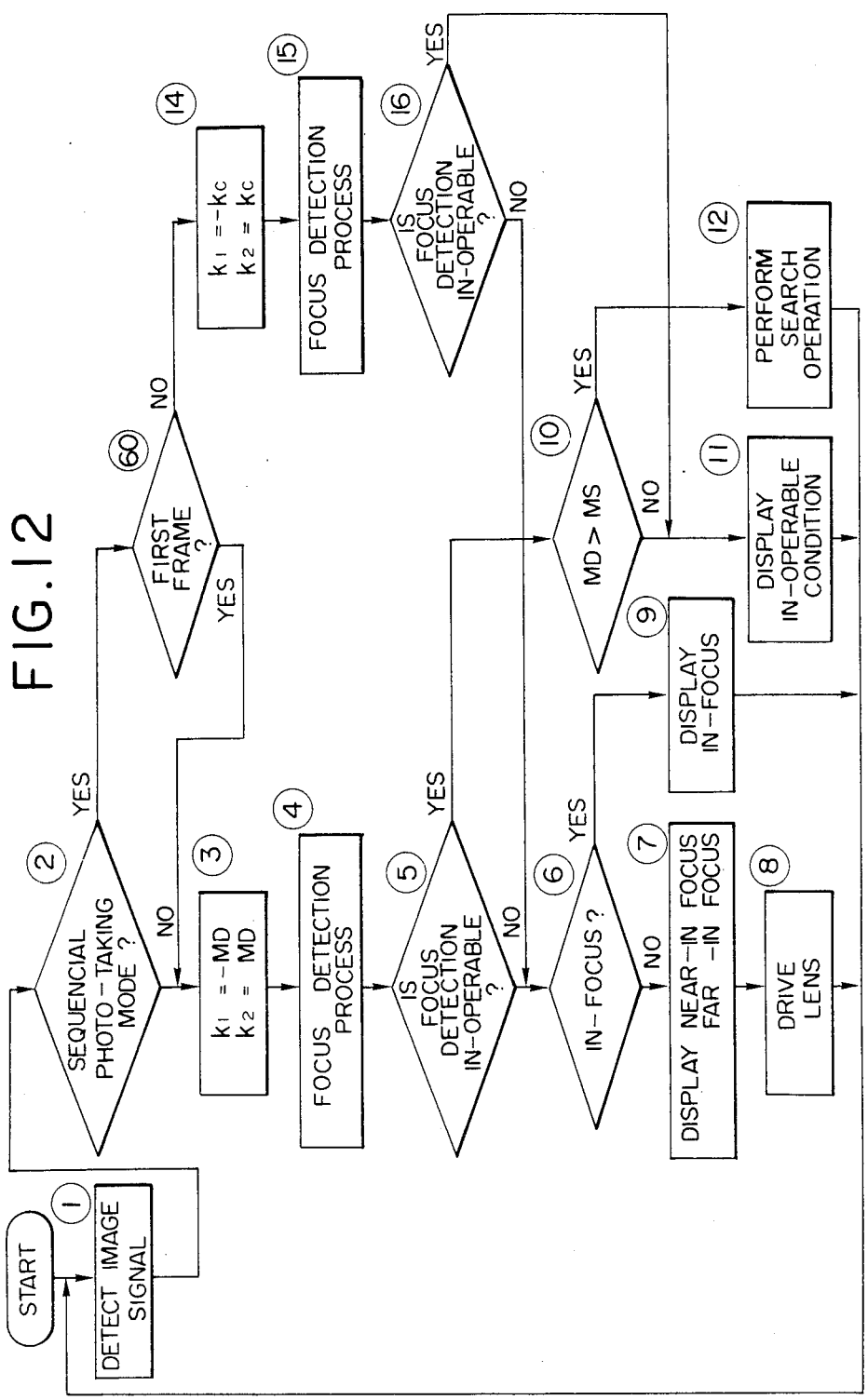
FIG. 12 shows a flow chart of another embodiment.

FIG. 12 shows a flow chart of another embodiment. Most portions of this flow chart correspond to the flow chart of FIG. 2 and a step 60 is newly added.

[Step 60] Whether a frame is the first one in the continuous photographing mode or not is checked. If it is, the process proceeds to the step 3, and if not, the process proceeds to the step 14.

In the present embodiment, during the continuous photographing mode, the range of correlation processing, that is, the processing range is narrowed. Accordingly, the focusing state detection time is shortened and the focusing state detection compatible to the high speed continuous photographing can be carried out. At a second frame in the continuous photographing mode, the operation is the same as that of the normal photographing mode (single photographing mode). The range of displacement is set to the relative displacement kc in or after the second frame. Accordingly, a probability that the focusing state detection is disabled is lowered.

In the present embodiment, the operation in the first frame of the continuous photographing mode is the same as that of the normal photographing mode. Alternatively, in the continuous photographing mode, the process may immediately proceed to the step 14, that is, the processing range may be set to the relative displacement kc. As a result, a probability that the focusing state detection is enabled is lowered but photographing suitable to the continuous photographing mode is attained.

We claim:

1. An apparatus for detecting a focusing state of an objective lens, comprising:
   light intensity forming optical means for forming light intensity distributions concerning images whose relative positional relationship changes with the focusing state of the objective lens;
   sensing means having a plurality of sensors for sensing said light intensity distributions to produce first and second signals relating to the light intensity distributions;
   signal processing means for relatively shifting the first and second signals by determining correlation information and producing a focusing signal for the objective lens in accordance with the correlation information; and
   altering means for altering a displacement range within which the first and second signals are relatively displaced.

2. An appartus for detecting a focusing state of an objective lens according to claim 1 wherein said altering means alters the displacement in accordance with a maximum defocus amount inherent to the objective lens.

3. An apparatus for detecting a focusing state of an objective lens according to claim 1 wherein said altering means alters a displacement in accordance with a current focus setting of the objective lens.

4. An apparatus for detecting a focusing state of an objective lens according to claim 1 wherein said altering means alters a displacement in accordance with a maximum defocus amount inherent to the objetive lens and a position of a focusing area of the objective lens on a optical axis.

5. An apparatus for detecting a focusing state of an objective lens according to claim 1 wherein said altering means alters a displacement smaller than a normal displacement in and after a second frame in a continuous photographing mode.

6. A camera system comprising: an imaging lens assembly removably mounted on a camera body and having a focusing lens unit including focusing lens means for forming an object image and information storage means for storing defocus information on a maximum defocus amount;
   said camera body including light intensity distribution forming means for forming light intensity distributions concerning images whose relative positional relationship changes in accordance with a focusing state of the focusing lens means, sensing means having a plurality of sensors for sensing the light intensity distributions to produce first and second signals relating to the light distributions, signal processing means for relatively displacing the first and second signals by determining correlation information and producing a signal for adjusting the focusing state of said focusing lens means in accordance with said correlation information, and altering means for altering a displacement range within which said first and second signals are relatively displaced in accordance with defocus information stored in said information storage means.

7. A camera system according to claim 6 wherein said camera body further includes position detection means for detecting a position of said focusing lens unit on an optical axis to produce position information, and said altering means alters the diplacement range in accordance with said position information.

8. A camera system according to claim 6 wherein said camera body further includes mode selection means for (1) selecting a continuous photographing mode or a single photographing mode, and (2) producing continuous photographing mode information indicating at least a second frame in the continuous photographing mode, and wherein said altering means narrows the displacement range in accordance with the continuous photographing mode information.

9. A camera system according to claim 6 wherein said signal processing means causes said camera system to operate in a non-standard manner if a focusing state of said focusing lens means cannot be detected, and said camera body further includes inhibit means for inhibiting the non-standard operation when said defocus information is smaller than a predetermined value.

10. An apparatus for detecting a focusing state of an objective lens, comprising:
light intensity distribution forming means for forming light intensity distributions concerning images whose relative positional relationship changes with the focusing state of the objective lens;
sensing means having a plurality of sensors for sensing the light intensity distributions to produce first and second signals relating to the light intensity distributions;
signal processing means for (1) relatively shifting said first and second signals by determining correlation information and producing a signal for adjustng the focusing state of the objective lens in accordance with said correlation information, and (2) producing a search signal for causing the objective lens to search when the focusing state detection is disabled; and
search inhibit means for inhibiting the searching when a maximum defocus amount of the objective lens is smaller than a predetermined value.

* * * * *

UNITED STATES PATENT AND TRADEMARK OFFICE
CERTIFICATE OF CORRECTION

PATENT NO. : 4,792,668

DATED : December 20, 1988

INVENTOR(S) : Akashi, et al

It is certified that error appears in the above-identified patent and that said Letters Patent is hereby corrected as shown below:

COLUMN 2
  Line 16, change "(M=N-k|-1)" to --(M=N-|k|-1),--;
  Lines 18-23, In each of equations (2) and (3), change
      "B(j)↑" to --B(j)|--; and
    In each of equations (4) and (5), change
      "|A(i),B(j)↑" to --[A(i),B(j)]--.

COLUMN 3
  Line 65, change "is" to --which is--.

COLUMN 4
  Line 10, change "hhe" to --the--; and
  Line 12, delete "than".

COLUMN 6
  Line 56, change "and and" to --and--.

COLUMN 7
  Line 42, delete "a".

COLUMN 8
  Line 18, change "position" to --position.--;
  Line 26, delete "a"; and
  Line 47, change "heretofore" to --have heretofore--.

UNITED STATES PATENT AND TRADEMARK OFFICE
CERTIFICATE OF CORRECTION

PATENT NO. : 4,792,668

DATED : December 20, 1988

INVENTOR(S) : Akashi, et al

It is certified that error appears in the above-identified patent and that said Letters Patent is hereby corrected as shown below:

COLUMN 10
    Line 39, delete "ti".

COLUMN 11
    Line 26, change "a" to --as--.

COLUMN 12
    Line 40, change "appartus" to --apparatus--.

Signed and Sealed this

Seventeenth Day of October, 1989

Attest:

DONALD J. QUIGG

Attesting Officer

Commissioner of Patents and Trademarks